US008411634B2

(12) United States Patent
Miki et al.

(10) Patent No.: US 8,411,634 B2
(45) Date of Patent: *Apr. 2, 2013

(54) USER APPARATUS, BASE STATION APPARATUS, AND METHOD IN MOBILE COMMUNICATION SYSTEM

(75) Inventors: Nobuhiko Miki, Yokohama (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/110,675

(22) Filed: May 18, 2011

(65) Prior Publication Data

US 2011/0216729 A1 Sep. 8, 2011

Related U.S. Application Data

(63) Continuation of application No. 12/531,646, filed as application No. PCT/JP2008/054642 on Mar. 13, 2008, now Pat. No. 7,969,943.

(30) Foreign Application Priority Data

Mar. 20, 2007 (JP) ................................. 2007-073724

(51) Int. Cl.
*H04W 72/04* (2009.01)

(52) U.S. Cl. ........ 370/329; 370/311; 370/328; 370/319; 370/256; 370/335; 455/403; 455/515; 455/450; 455/422.1

(58) Field of Classification Search .......... 370/328–329, 370/325, 335, 331
See application file for complete search history.

(56) References Cited

U.S. PATENT DOCUMENTS 7,436,801 B1 10/2008 Kanterakis
7,808,953 B2 * 10/2010 Kuroda et al. ................. 370/335
2005/0180324 A1 8/2005 Niemela et al.
2006/0007887 A1 1/2006 Kwon et al.
2007/0211656 A1 9/2007 Kwak et al.
2007/0237248 A1 10/2007 Jung et al.
2008/0075184 A1 * 3/2008 Muharemovic et al. ...... 375/260

FOREIGN PATENT DOCUMENTS

| EP | 1231745 A2 | 8/2002 |
|---|---|---|
| EP | 1 947 878 A1 | 7/2008 |
| JP | 2010512122 A | 4/2010 |
| JP | 4563417 | 8/2010 |
| JP | 2010-530651 A | 9/2010 |
| WO | 2007/055310 A1 | 5/2007 |

(Continued)

OTHER PUBLICATIONS

D. C. Chu, "Polyphase Codes with Good Periodic Correlation Properties", IEEE Trans. Inform. Theory, vol. IT-18, pp. 531-532, Jul. 1972.

(Continued)

*Primary Examiner* — Kiet Doan
*Assistant Examiner* — Michael T Vu
(74) *Attorney, Agent, or Firm* — Osha Liang LLP

(57) ABSTRACT

A user apparatus transmits an uplink control signal to a base station apparatus using a single carrier scheme. The user apparatus includes: a unit configured to receive a downlink control signal and a downlink data signal; a unit configured to prepare acknowledgement information indicating positive acknowledgement or negative acknowledgement for the downlink data signal; a unit configured to prepare the uplink control signal including the acknowledgement information; a unit configured to transmit the uplink control signal using different resources which are different from resources that can be used for an uplink data signal; and a storage unit configured to store predetermined correspondence relationship which uniquely associates resources of the downlink control signal or the downlink data signal with resources used for the uplink control signal.

7 Claims, 15 Drawing Sheets

FOREIGN PATENT DOCUMENTS

| WO | 2008070589 A2 | 6/2008 |
|---|---|---|
| WO | 2008085000 A1 | 7/2008 |
| WO | 2008115004 A2 | 9/2008 |

OTHER PUBLICATIONS

Texas Instruments, "On Allocation of Uplink Pilot Sub-Channels in EUTRA SC-FDMA", 3GPP TSG RAN WG1 Ad Hoc on LTE, R1-050822, London, UK, Aug. 29-Sep. 2, 2005.

International Search Report w/translation from PCT/JP2008/054642 dated Jun. 24, 2008 (2 pages).

Written Opinion from PCT/JP2008/054642 dated Jun. 24, 2008 (3 pages).

3GPP TSG RAN WG1 LTE Ad Hoc; R1-061675; "Data-non-associated L1/L2 Control Channel Structure for E-UTRA" NTT DoCoMo, Inc. et al.; Cannes, France; Jun. 27-30, 2006 (6 pages).

3GPP TSG RAN WG1 Meeting #48, R1-071245; Approved Report of 3GPP TSG RAn WG1 #47bis v2.0.0; MCC Support; St. Louis, US; Feb. 2007 (119 pages).

US Office Action issued in U.S. Appl. No. 12/531,646, mailed Aug. 17, 2010, 15 pages.

US Notice of Allowance issued in U.S. Appl. No. 12/531,646, mailed Feb. 22, 2011, 17 pages.

Extended European Search Report for Application No. 08722046.3, mailed on Jun. 18, 2012 (8 pages).

Japanese Office Action for Application No. 2010-129039, mailed on Apr. 17, 2012 (5 pages).

KDDI, NTT DoCoMo, "CDMA Based Multiplexing of ACK/NACK and CQI Control Information in E-UTRA Uplink" 3GPP TSG RAN WG1 Meeting #48, R1-070884, St. Louis, USA, Feb. 12-16, 2007.

NTT DoCoMo, Fujitsu, KDDI, Mitsubishi Electric, Sharp "CDMA-Based Multiplexing Method for Multiple ACK/NACK and CQI in E-UTRA Uplink" 3GPP TSG RAN WG1 Meeting #48, R1-070862, St. Louis, USA, Feb. 12-16, 2007.

NTT DoCoMo, NEC, "Persistent Scheduling in E-UTRA" 3GPP TSG RAN WG1 Meeting #47, R1-063319, Riga, Latvia, Nov. 6-10, 2006.

Patent Abstracts of Japan for Japanese Publication No. 2008-236426, publication date Oct. 2, 2008 (1 page).

* cited by examiner

FIG.12
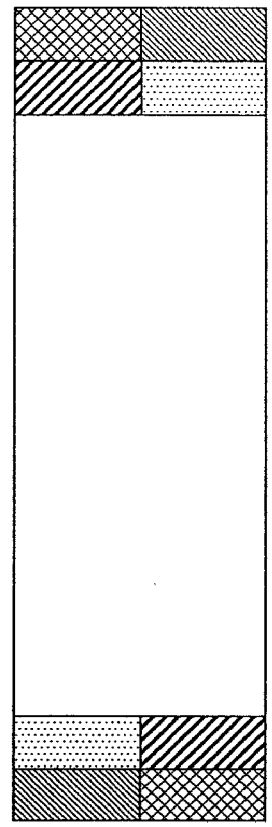
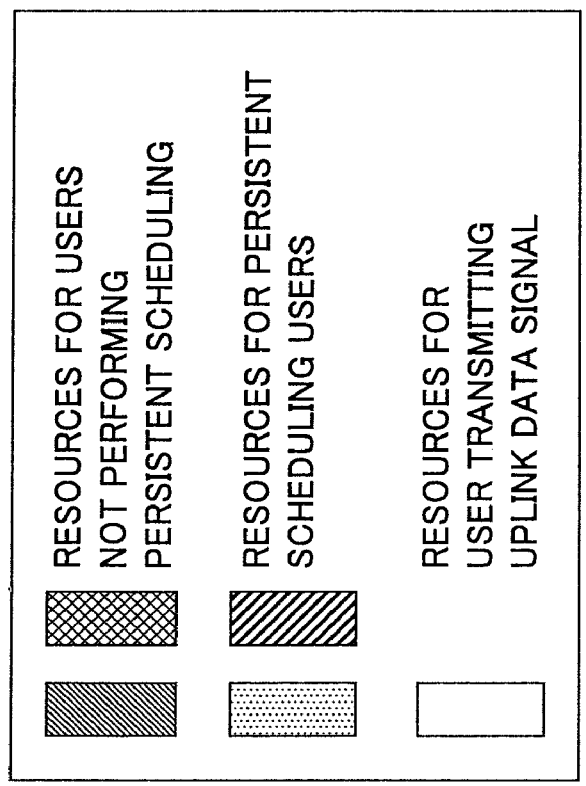
RESOURCES FOR USERS NOT PERFORMING PERSISTENT SCHEDULING
RESOURCES FOR PERSISTENT SCHEDULING USERS
RESOURCES FOR USER TRANSMITTING UPLINK DATA SIGNAL

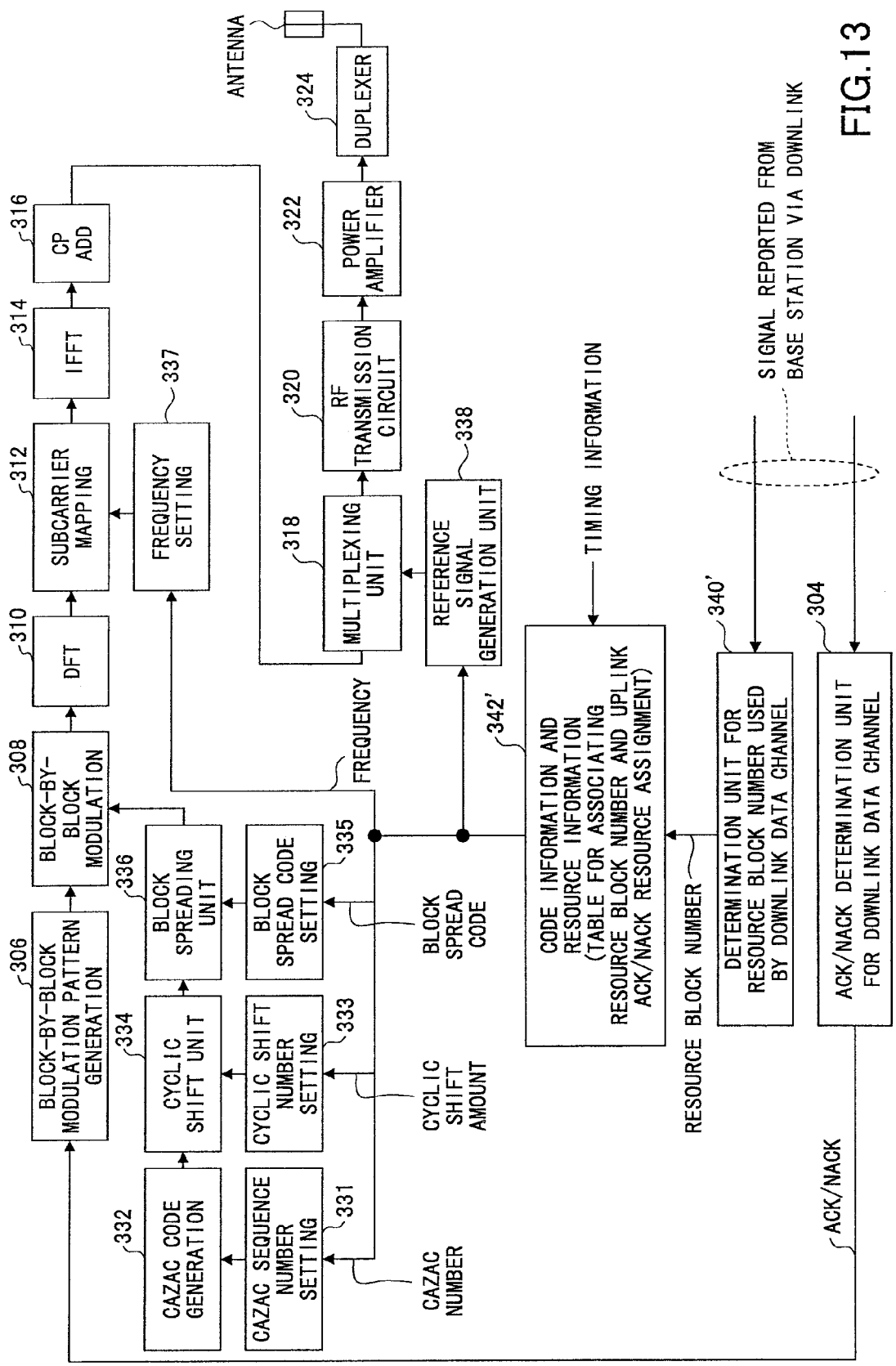

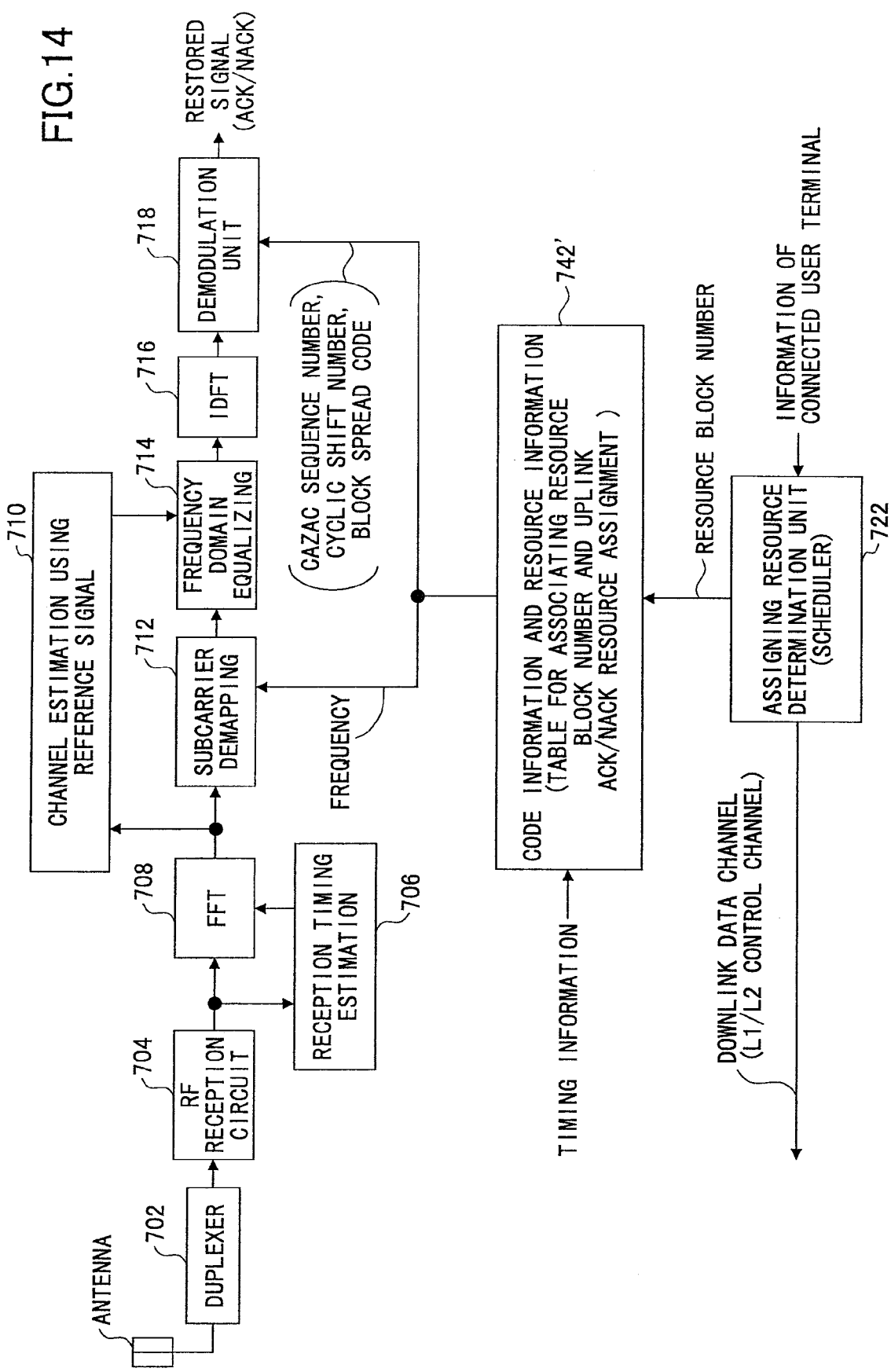

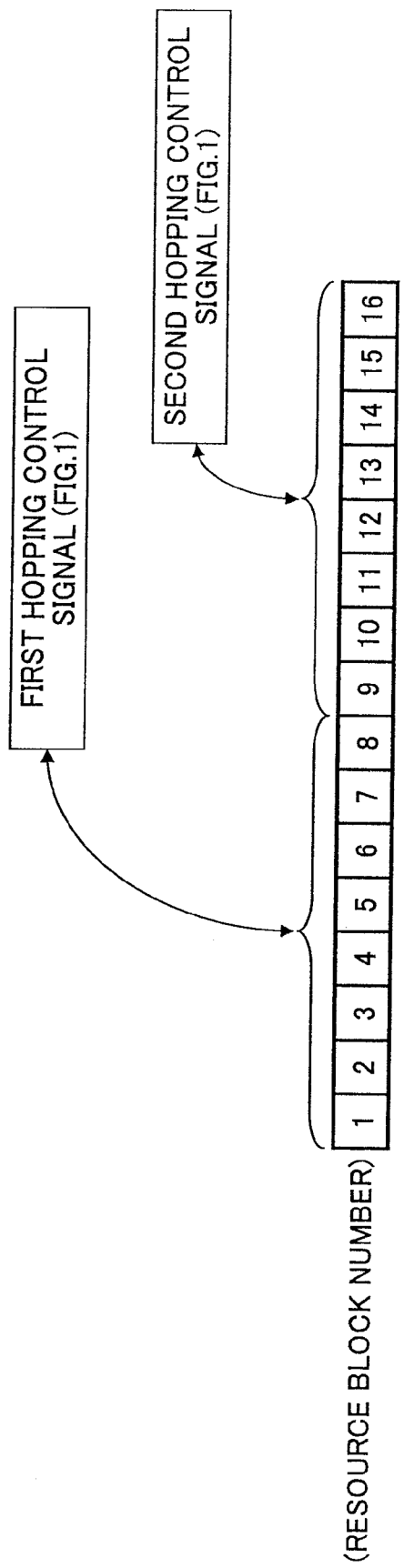

USER APPARATUS, BASE STATION APPARATUS, AND METHOD IN MOBILE COMMUNICATION SYSTEM

CROSS-REFERENCE TO RELATED APPLICATIONS

This is a continuation application of U.S. patent application Ser. No. 12/531,646 filed Sep. 16, 2009, which is a national stage application of PCT/JP2008/054642, and claims priority to JP2007/073724.

TECHNICAL FIELD

The present invention relates to the next generation mobile communication scheme. More particularly, the present invention relates to a user apparatus, a base station apparatus, and a method in the mobile communication system of the next generation mobile communication scheme.

BACKGROUND ART

In this kind of technical field, research and development on the next generation communication system is rapidly progressing. In the communication system considered as of now, from the view point of widening coverage while reducing PAPR (Peak-to-Average Power Ratio), it is proposed to use a single carrier scheme for uplink. In addition, in this communication system, for both of uplink and downlink, radio resources are properly assigned, as a form of a shared channel which is shared by a plurality of users, according to communication states of each user and the like. More particularly, a data signal of a user in the uplink is transmitted by a physical uplink shared channel (PUSCH). The terms "channel" and "signal" may be used synonymously as long as there is no fear of confusion. A data signal of a user in the downlink is transmitted by a physical downlink shared channel (PUSCH).

Processing for determining assignment is called scheduling. In order to properly perform scheduling in the uplink, each user apparatus transmits a reference signal (also called as a pilot channel) to a base station, and the base station evaluates the channel state of the uplink based on the reception quality. In addition, in order to perform scheduling in the downlink, the base station transmits a reference signal to the user apparatus, and the user apparatus reports to the base station information indicating channel state (CQI: Channel Quality Indicator) based on the reception quality of the reference signal. Based on the CQI reported from each user apparatus, the base station evaluates the channel state of the downlink to perform scheduling of downlink. The contents of scheduling are transmitted to each user apparatus by a downlink control signal. This control signal is called a downlink L1/L2 control channel or a downlink L1/L2 control signal.

As uplink control signals, there are control information (called first control information, for the sake of convenience) that should be transmitted by accompanying an uplink data signal, and control information (called second control information, for the sake of convenience) that is transmitted irrespective of the presence or absence of the uplink data signal. The first control information includes information necessary for demodulation of a data signal, such as modulation scheme, channel coding rate and the like of the data signal. The second control information includes CQI information of downlink channel, acknowledgement information (ACK/NACK) of downlink data signal, and information of resource assignment request, and the like. Therefore, there is a possibility that the user apparatus transmits only the first control information, only the second control information, or both of the first and the second control information by using the uplink control signal.

When a resource block (radio resource) is assigned for transmitting an uplink data channel, the first control information (and second control information as necessary) is transmitted by the resource block. On the other hand, when the uplink data signal is not transmitted, it is considered to transmit the second control signal by using dedicated resources (dedicated band). In the following, an outline of an example is described in which a band is used in such a way.

FIG. 1 shows a band use example of uplink. FIG. 1 shows resources (a plurality of resource blocks) for transmitting the physical uplink shared channel (PUSCH) that is the uplink data signal, and shows resources (corresponding to the dedicated band) for a user to which the resources for the PUSCH are not assigned to transmit the uplink control signal. The latter is called a physical uplink control channel (PUCCH). In the example shown in the figure, one or more of four resource blocks are assigned to users, and a first hopping control signal and a second hopping control signal are prepared in a transmission time interval (TTI), and a third hopping control signal and a fourth hopping control signal are prepared in the following TTI. Each hopping control signal corresponds to PUCCH. By performing hopping with respect to time and frequency in TTIs or subframes, diversity effect can be obtained. Each of the first to fourth hopping control signals may be occupied by one user or may be multiplexed by a plurality of users. This type of transmission scheme of the uplink control signals is described in the non-patent document 1.

[Non-patent document 1] 3GPP,R1-071245

DISCLOSURE OF THE INVENTION

Problem to be Solved by the Invention

In the above-mentioned proposed methods, it is necessary to report, to the user apparatus, which resource should be used for the uplink control signal by using the downlink L1/L2 control signal. As to the uplink control signal for a user to which resources are not assigned for transmission of the uplink data signal, it is necessary to report, to each user apparatus, which slot in the dedicated resources should be used for transmission of the uplink control signal. The uplink control signal may only include acknowledgment information (ACK/NACK), for example. Essentially, only one bit is necessary for the acknowledgment information. But, the acknowledgment information plays a central role in retransmission control, and, true or false of the acknowledgment information largely affects throughput of data transmission. However, in the conventional method, for transmitting the acknowledgment information, which is merely one bit, using the uplink, it is necessary to report, to the user apparatus, which resource should be used for transmission of the acknowledgment information by using the downlink L1/L2 control signal each time. Thus, there is a problem that such processing is inefficient. In addition, there is a problem in that it is difficult to enhance quality of the acknowledgment information since it is hard to obtain coding gain for the acknowledgment information having merely one bit.

An object of the present invention is to efficiently report, to the user apparatus, which resource should be used for transmitting, in the uplink, control information that has a small number of bits, but that requires high quality.

Means for Solving the Problem

In the present invention, a user apparatus which transmits an uplink control signal to a base station apparatus using a single carrier scheme is used. The user apparatus includes: a unit configured to receive a downlink control signal and a downlink data signal; a unit configured to prepare acknowledgement information indicating positive acknowledgement or negative acknowledgement for the downlink data signal; a unit configured to prepare the uplink control signal including the acknowledgement information; a unit configured to transmit the uplink control signal using different resources which are different from resources that can be used for an uplink data signal; and a storage unit configured to store predetermined correspondence relationship which uniquely associates resources of the downlink control signal or the downlink data signal with resources used for the uplink control signal.

Effect of the Present Invention

According to the present invention, it becomes possible to efficiently report, to the user apparatus, information indicating which resource should be used in uplink for transmitting control information that has a small number of bits, but that requires high quality.

BRIEF DESCRIPTION OF THE DRAWINGS

FIG. 12 is a diagram showing a situation in which specific resources are reserved for a user performing persistent scheduling;

FIG. 13 shows a block diagram of the user apparatus according to a second embodiment of the present invention;

FIG. 14 shows a block diagram of the base station apparatus according to the second embodiment of the present invention; and FIG. 15 is a diagram showing an example of correspondence relationship between resource blocks addressed to the user apparatus and resources of the uplink control signal.

DESCRIPTION OF REFERENCE SIGNS

Figure 1:
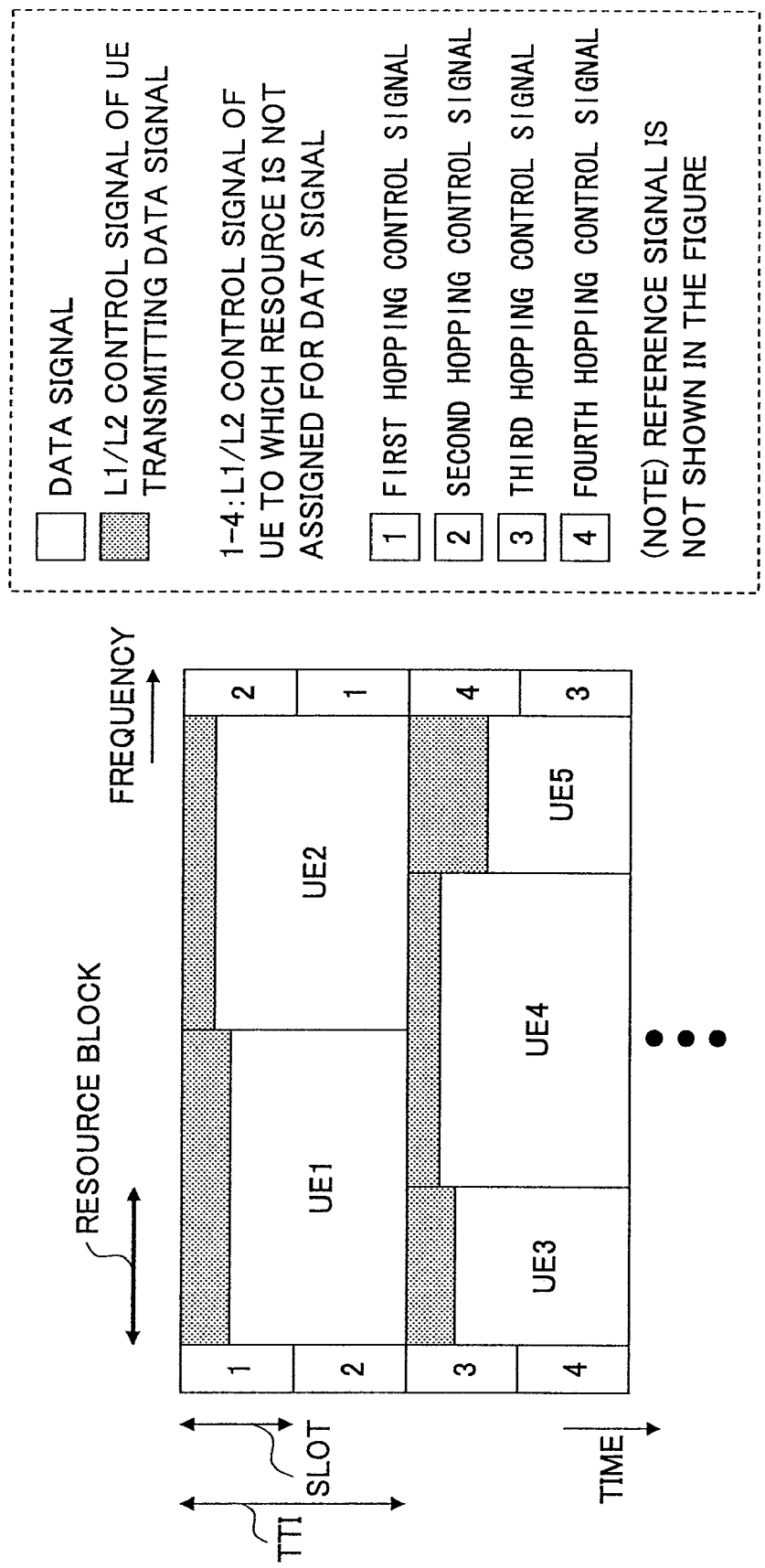
FIG. 1 is a diagram showing a band use example used in a mobile communication system.

304 ACK/NACK determination unit
306 block-by-block modulation pattern generation
308 block-by-block modulation unit
310 discrete Fourier transform unit (DFT)
312 subcarrier mapping
314 inverse fast Fourier transform unit
316 cyclic prefix (cp) adding unit
318 multiplexing unit
320 RF transmission circuit
322 power amplifier
324 duplexer
331 CAZAC sequence number setting unit
332 CAZAC code generation unit
333 cyclic shift number setting unit
334 cyclic shift unit
335 block spread code setting unit
336 block spreading unit
337 frequency setting unit
338 reference signal generation unit
340, 340' determination unit
342, 342' code information and resource information unit
702 duplexer
704 RF reception circuit
706 reception timing estimation unit
708 fast Fourier transform unit (FFT)
710 channel estimation unit
712 subcarrier demapping unit
714 frequency domain equalizing unit
716 inverse discrete Fourier transform unit (IDFT)
718 demodulation unit
722 scheduler
742, 742' code information and resource information unit

PREFERRED EMBODIMENTS FOR CARRYING OUT THE INVENTION

For the sake of convenience of explanation, although the present invention is described by being classified into some embodiments, classification into each embodiment is not essential in the present invention, and equal to or more than two embodiments may be used as necessary. Although specific numerical values are in explanation, such numerical values are merely examples, so that any appropriate value may be used unless specified otherwise.

[Embodiment 1]

Figure 2:
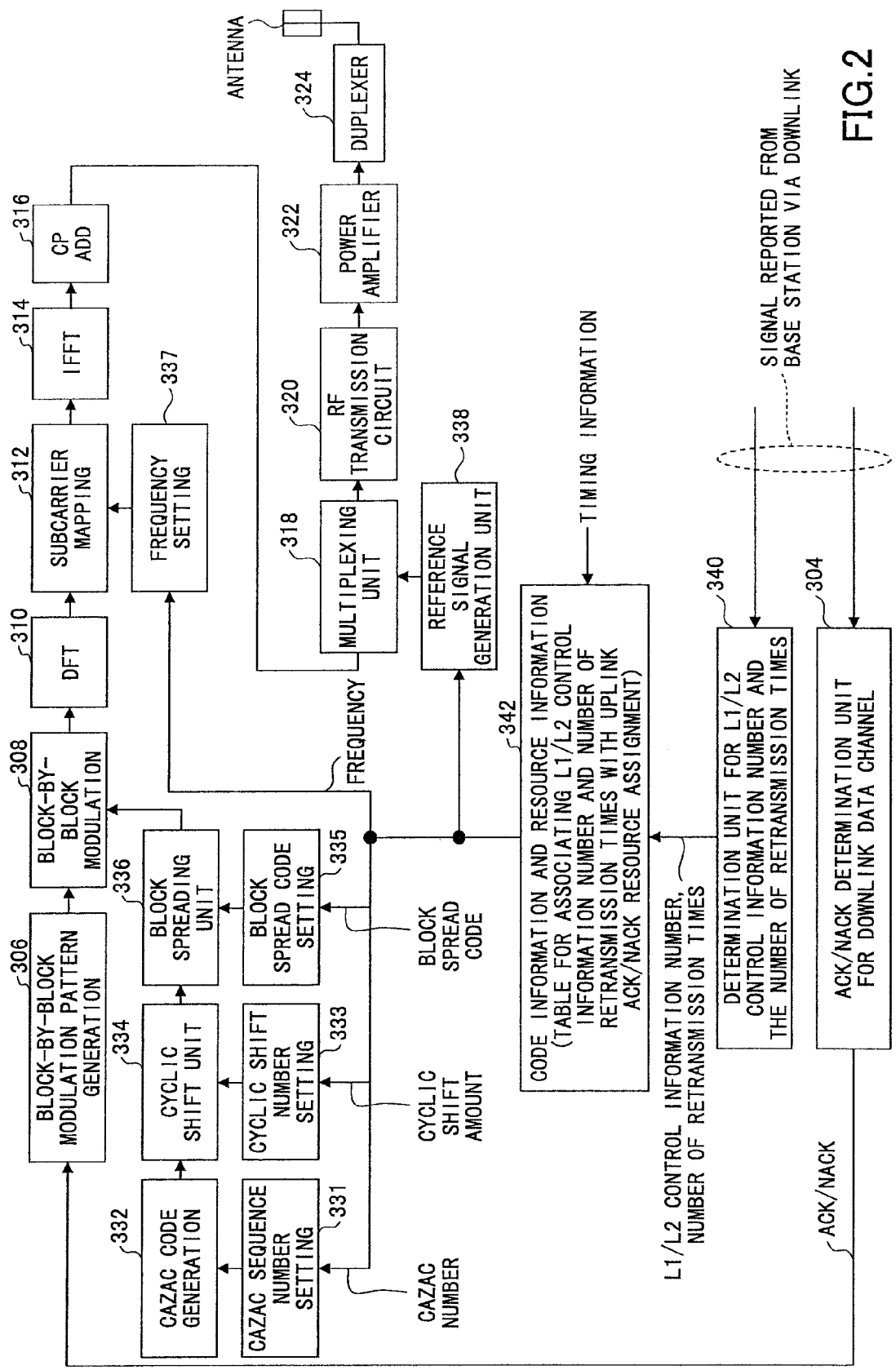
FIG. 2 shows a block diagram of a user apparatus according to a first embodiment of the present invention.

FIG. 2 shows a block diagram of a user apparatus according to an embodiment of the present invention. FIG. 2 shows an ACK/NACK determination unit 304, a block-by-block modulation pattern generation unit 306, a block-by-block modulation unit 308, a discrete Fourier transform (DFT) unit 310, a subcarrier mapping unit 312, an inverse fast Fourier transform unit (IFFT) 314, a cyclic prefix (CP) adding unit 31, a multiplexing unit 318, a RF transmission circuit 320, a power amplifier 322, a duplexer 324, a CAZAC sequence number setting unit 331, a CAZAC code generation unit 332, a cyclic shift number setting unit 333, a cyclic shift unit 334, a block spread code setting unit 335, a block spreading unit 336, a frequency setting unit 337, a reference signal generation unit 338, a determination unit 340 for L1/L2 control information number and the number of times of retransmission, and a code information and resource information unit 342.

The ACK/NACK determination unit 304 determines whether there is an error in each of packets that form the received downlink data signal, and outputs a determination result as acknowledgement information. The acknowledgement information may be represented as positive acknowledgement (ACK) indicating there is no error or negative acknowledgement (NACK) indicating there is an error. Since it is only necessary that the acknowledgement information can represent presence or absence of an error in the received packet, the acknowledgement information can be represented essentially by one bit. But, the acknowledgement information may be represented by a larger number of bits.

The block-by-block modulation pattern generation unit 306 shapes each of channel state information (CQI) and acknowledgment information (ACK/NACK) into a block-by-block modulation pattern. A predetermined number of blocks are included in a subframe, and the subframe forms a transmission time interval (TTI) which is an assignment unit of resources.

Figure 3:
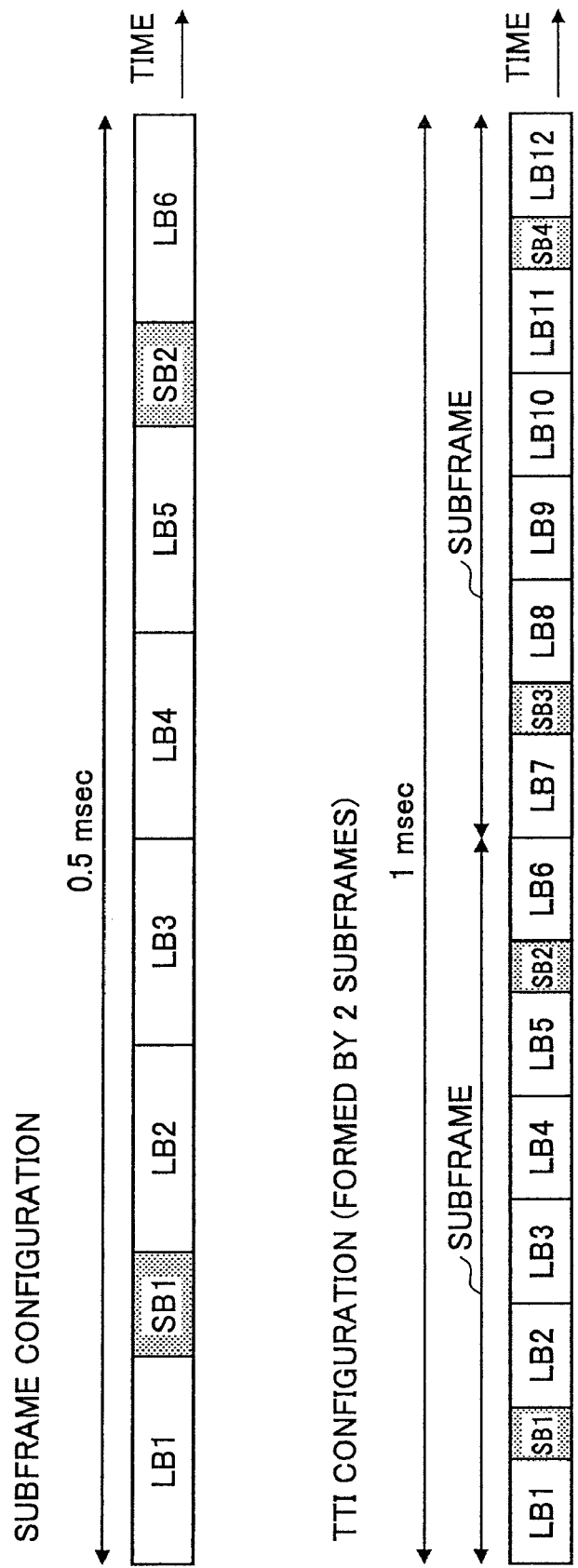
FIG. 3 is a diagram showing examples of TTI, subframe and block.

FIG. 3 shows examples of the subframe and the TTI. In the examples shown in the figure, TTI of 1.0 ms includes two subframes each being 0.5 ms, and each subframe includes six long blocks (LB) and two short blocks (SB). The long block is 66.7 μs, for example. The short block is 33.3 μs, for example. The numerical values are merely examples, and can be changes as necessary. Generally, the long block is used for transmitting data (control signal, data signal and the like) which is unknown for the receiving side, and the short block is used for transmitting data (pilot channel and the like) which is known to the receiving side. In the example shown in the figure, one TTI includes 12 long blocks (LB1-LB12) and 4 short blocks (SB1-SB4).

The block-by-block modulation pattern generation unit 306 shown in FIG. 2 determines correspondence relationship between one or more of the 12 blocks (LB1-LB12) and bits representing channel state information (CQI), and determines correspondence relationship between one or more of the 12 blocks (LB1-LB12) and bits representing acknowledgement information (ACK/NACK). The user apparatus transmits only channel state information, transmits only acknowledgement information, or transmits both of them, by using an uplink control signal. Therefore, (A) all of the 12 blocks may be associated with channel state information, (B) all of the 12 blocks may be associated with acknowledgement information, or (C) a part of 12 blocks may be associated with the channel state information and the remaining part may be associated with the acknowledgement information. In any way, based on the correspondence relationship, one factor is prepared for each of the 12 blocks, so that 12 factors (first factor-twelfth factor) are prepared in total per one TTI.

The block-by-block modulation unit 308 forms a first long block by multiplying, by the first factor, all chips of a CAZAC code sequence (the length of the sequence can be associated with one long block) assigned to the user apparatus, and forms a second long block by multiplying all chips of the same CAZAC code sequence by the second factor, and after that, similarly, the block-by-block modulation unit 308 forms a twelfth long block by multiplying all chips of the same CAZAC code sequence by the twelfth factor, so that the block-by-block modulation unit 308 derives an information sequence to be transmitted in one TTI. The CAZAC code sequence used commonly for all blocks is an orthogonal code sequence assigned in the residing cell for identifying the user apparatus. Properties of the CAZAC code sequence are described later.

The discrete Fourier transform unit (DFT) 310 performs discrete Fourier transform to transfer time series information into information of the frequency domain.

The subcarrier mapping unit 312 performs mapping in the frequency domain. Especially when the frequency division multiple access (FDM) scheme is used for multiplexing a plurality of user apparatuses, the subcarrier mapping unit 312 performs mapping of signals based on bands set in the frequency setting unit 336. There are two types of FDM schemes which are a localized FDM scheme and a distributed FDM scheme. In the localized FDM scheme, a continuous band is assigned for each individual user on the frequency axis. In the distributed FDM scheme, a downlink signal is generated such that the signal includes discontinuous frequency components over a wide band (over the whole of the specific band $F_{RB2}$ for uplink control signal).

The inverse fast Fourier transform unit (IFFT) 314 restores the signal of the frequency domain into a signal of the time domain by performing inverse Fourier transform.

The cyclic prefix (CP) adding unit 316 adds a cyclic prefix to information to be transmitted. The cyclic prefix (CP) functions as a guard interval for absorbing multipath propagation delay and for absorbing differences of reception timing among a plurality of users in the base station.

The multiplexing unit 318 multiplexes the reference signal into information to be transmitted so as to generate a transmission symbol. The reference signal is transmitted by the short block (SB1, SB2) shown in the frame configuration of FIG. 3. The reference signal is a signal that includes a pattern which is known to the transmission side and the reception side, and can be also referred to as a pilot signal, a pilot channel, a training signal, and the like.

The RF transmission circuit 320 performs processing such as digital-analog conversion, frequency conversion, band limitation and the like for transmitting the transmission symbol by a radio frequency.

The power amplifier 332 adjusts transmission power.

The duplexer 324 properly separates a transmission signal and a received signal such that simultaneous communication is realized.

The CAZAC sequence number setting unit 331 sets a sequence number of CAZAC code sequence used by the user apparatus. The CAZAC code will be described later with reference to FIG. 4.

The CAZAC code generation unit 332 generates the CAZAC code sequence according to the set sequence number.

The cyclic shift number setting unit 333 sets a cyclic shift amount of the CAZAC code sequence to be used by the user apparatus according to code information.

The cyclic shift unit 334 derives another code by cyclically rearranging the CAZAC code sequence according to the set cyclic shift amount.

In the following, an outline of the CAZAC code is described.

Figure 4:
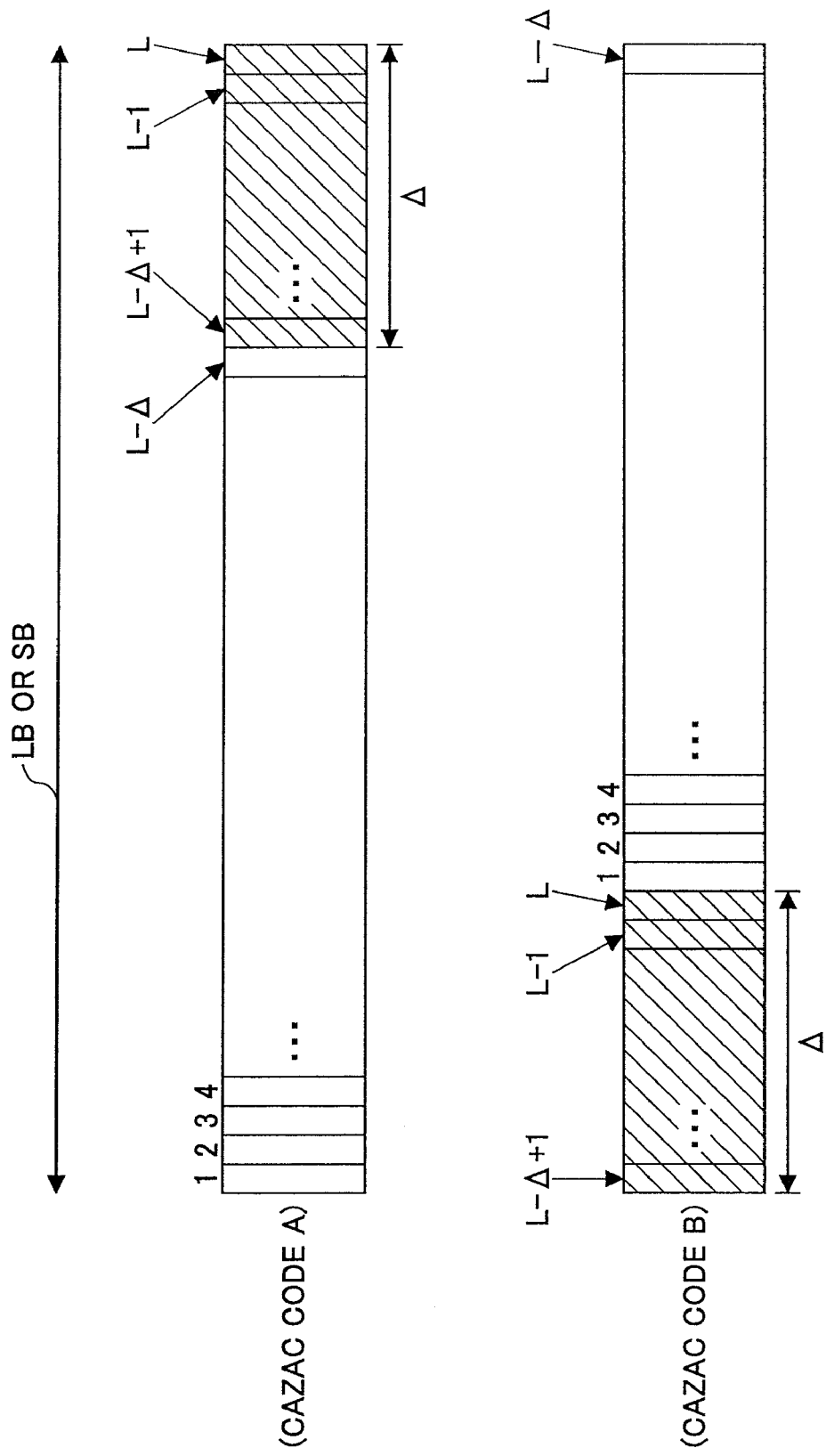
FIG. 4 is a diagram for explaining properties of CAZAC code.

As shown in FIG. 4, it is assumed that a code length of a CAZAC code A is L. For the sake of convenience of explanation, although it is assumed that the code length corresponds to a time duration of L samples or L chips, such assumption is not essential for the present invention. Another code B is generated by moving a series of A samples (shaded area in the figure) including the last sample (L-th sample) of the CAZAC code A to the top of the CAZAC code A as shown in the lower side of FIG. 4. In this case, the CAZAC codes A and B are orthogonal to each other with respect to A=0~(L−1). That is, a CAZAC code is orthogonal to a code obtained by cyclically shifting the CAZAC code. Therefore, when one sequence of a CAZAC code of the code length L is prepared, L codes which are orthogonal to each other can be prepared theoretically. A CAZAC code A is not orthogonal to another CAZAC code C that cannot be obtained by cyclically shifting the CAZAC code A. However, a cross-correlation value between the CAZAC code A and a random code which is not a CAZAC code is remarkably greater than a cross-correlation value between the CAZAC code A and the CAZAC code C. Thus, CAZAC code is preferable also from the viewpoint of reducing cross-correlation amount (interference amount) between non-orthogonal codes.

In the present embodiment, each user apparatus uses a CAZAC code selected from among a group of CAZAC codes having such properties (a code sequence group derived by cyclically shifting a CAZAC code). In the present embodiment, among L codes that are orthogonal to each other, $L/L_A$ codes obtained by cyclically shifting a basic CAZAC code by $\Delta = n \times L_A$ are actually used as reference signals by mobile stations (n=0, 1, . . . , $(L-1)/L_A$). $L_A$ is an amount determined based on a multipath propagation delay amount. In doing this way, orthogonal relationship can be maintained in uplink control signals transmitted from individual user apparatuses under a multipath propagation environment. Details of the CAZAC code are described in D. C. Chu, "Polyphase codes with good periodic correlation properties", IEEE Trans. Inform. Theory, vol.IT-18, pp. 531-532, July 1972; 3GPP,R1-050822, Texas Instruments, "On allocation of uplink subchannels in EUTRA SC-FDMA", for example.

The block spreading unit 336 shown in FIG. 2 prepares a set of predetermined number of factors (block spread codes) and multiplies each of long blocks (LB) by each factor. The block spread code is an orthogonal code sequence, and which orthogonal code sequence is specified by information from a code information specifying unit 330.

Figure 5:
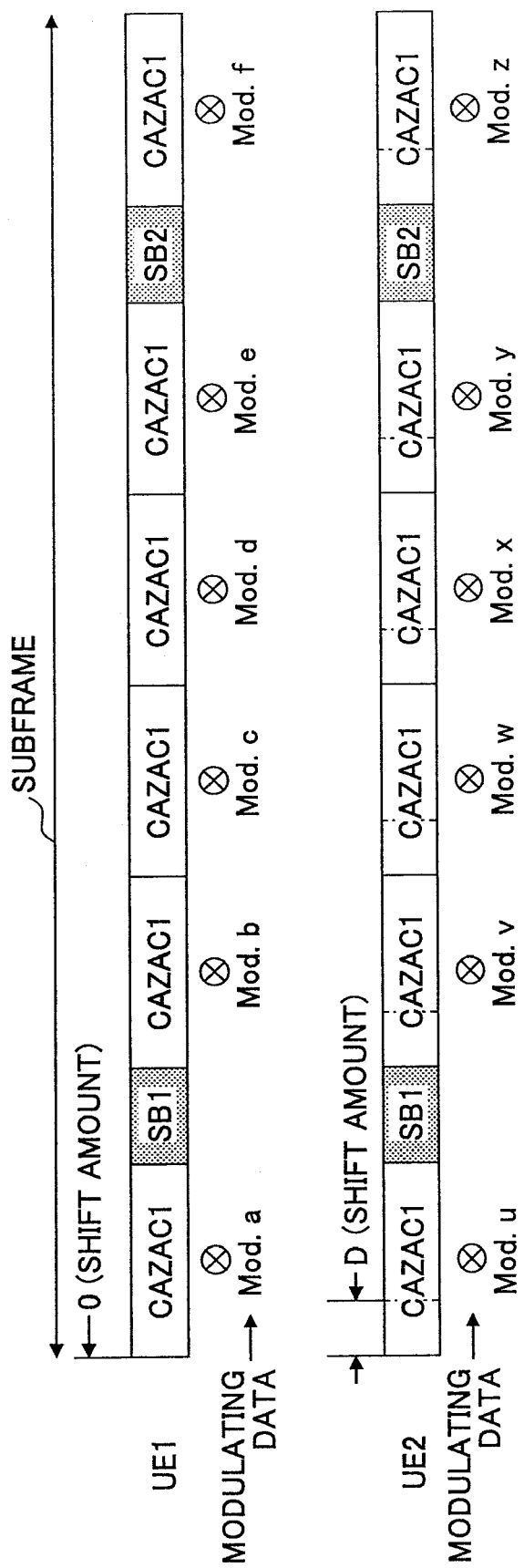
FIG. 5 is a diagram showing a situation in which each long block LB is multiplied by a factor (modulating data)

FIG. 5 shows subframes of a first user apparatus UE1 and a second user apparatus UE2 in which multiplication by the block spread code is not performed. Both of the first and the second user apparatuses use a CAZAC code sequence (CAZAC1). But, the second user apparatus uses a cyclic shift amount A which is different from that used by the first user apparatus. Therefore, two subframes transmitted by the user apparatuses are orthogonal to each other. "Mod.a" indicates data to modulate a first long block for the first user apparatus UE1, that is, "Mod.a" indicates a factor used for multiplication. "Mod.a"-"Mod.f" correspond to first factor to sixth factors (or seventh to eighth factors) for the first user apparatus UE1. "Mod.u"-"Mod.z" correspond to first factor to sixth factors (or seventh to eighth factors) for the second user apparatus UE1. Each factor (modulating data) may include any information.

Figure 6:
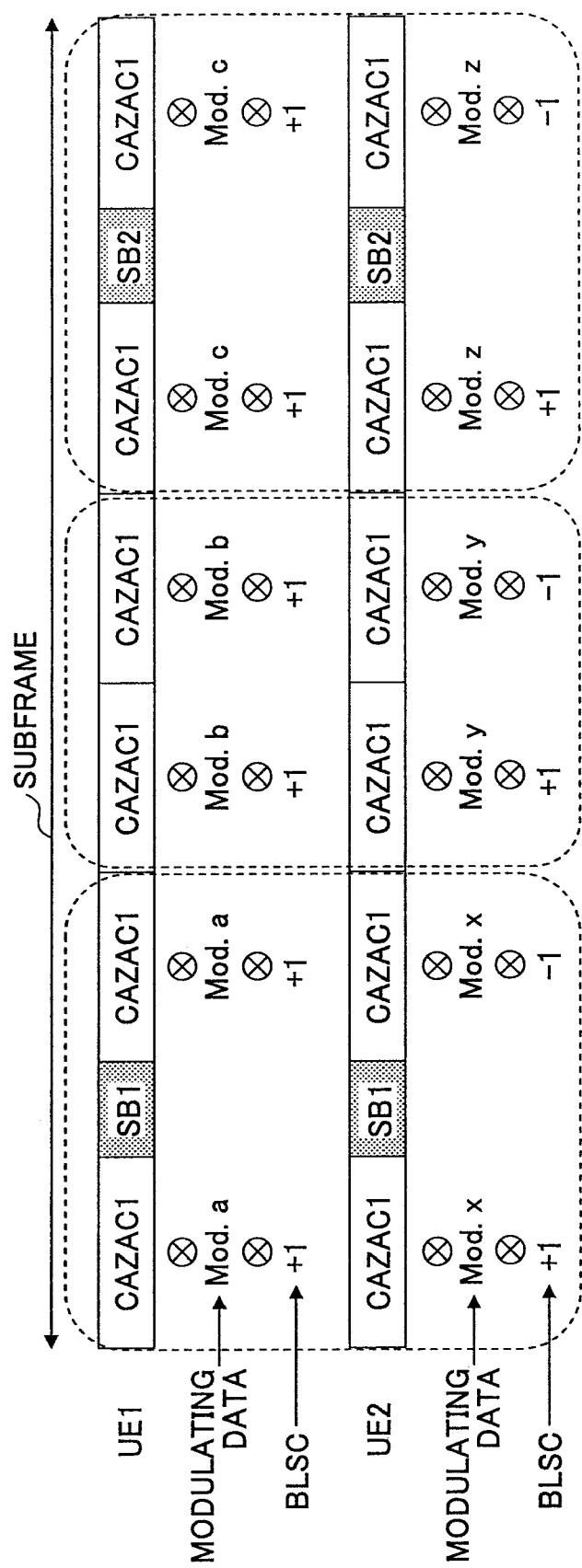
FIG. 6 is a diagram showing a situation in which each long block LB is multiplied by factors (modulating data and block spread code)

FIG. 6 shows a situation in which long blocks of each of the first and the second user apparatuses UE1 and UE2 are multiplied by block spread codes. In the example shown in the figure, a factor (separately from modulating data) is prepared every two long blocks. This factor forms a block spread code (BLSC). As shown in the broken line frame, an orthogonal code (1,1) is prepared for the first user apparatus UE1, and an orthogonal code (1,−1) is prepared for the second user apparatus UE2. As described in the first embodiment, as long as one or more resource blocks are multiplied by a same factor (value), orthogonality of the CAZAC code that forms the long block is not lost.

Therefore, as shown in the figure, when a set of factors by which the blocks is multiplied is codes that are orthogonal among users, users can be made orthogonal to each other using the codes while maintaining orthogonality of the CAZAC code. However, the blocks which are multiplied by an orthogonal code should have the same contents. In the example shown in the figure, for the first user UE1, each of the first factor and the second factor is "Mod.a", each of the third factor and the fourth factor is "Mod.b", and each of the fifth factor and the sixth factor is "Mod.c". Similarly, for the second user UE2, each of the first factor and the second factor is "Mod.x", each of the third factor and the fourth factor is "Mod.y", and each of the fifth factor and the sixth factor is "Mod.z". Thus, contents of information carried by the first to twelfth factors are limited to some extent. But, the limitation is not critical since the number of bits necessary for representing ACK/NACK etc. is relatively small.

Since the first and the second user apparatuses UE1 and UE2 can be identified by the block spread codes (1,1) and (1,−1), the CAZAC code shift amount used for the first and the second user apparatuses may be the same (it is not essential to use different cyclic shift amounts Δ). For the sake of convenience of explanation, although factors by which long blocks are multiplied are described, the short blocks SB may be multiplied by factors.

In the case when the frequency division multiplexing (FDM) scheme is applied for an uplink control signal from a plurality of user apparatuses, the frequency setting unit 337 shown in FIG. 2 specifies which frequency should be used by each user apparatus.

The reference signal generation unit 338 prepares a reference signal to be included in the uplink control signal. As mentioned above, the reference signal is transmitted using the short block (SB1,SB2) in the frame configuration shown in FIG. 3. The reference signal is also formed by a CAZAC code assigned to each user apparatus. The CAZAC code for the reference signal may be also specified by a sequence number and a cyclic shift amount.

Generally, the long block (LB) and the short block (SB) are different in length, in time duration, or in number of chips, a CAZAC code $C_L$ included in the long block (LB) and a CAZAC code $C_S$ included in the short block (SB) may be prepared separately. However, since both of them are used for a same user apparatus, there may be a relationship between the CAZAC codes $C_L$ and $C_S$ (for example, a part of $C_L$ may form $C_S$).

The unit 340 for determining the L1/L2 control information number and determining a number of times of retransmission demodulates and decodes the downlink L1/L2 control signal to specify where control information addressed to the user apparatus is mapped. In other words, the determination unit 340 specifies a position number to which the control information addressed to the user apparatus is mapped from among multiple pieces of control information of one or more users multiplexed in the downlink L1/L2 control information. For the sale of convenience of explanation, it is assumed that control information of N users are multiplexed into the downlink L1/L2 control signal, and that control information to the particular user apparatus is mapped to a X-th position. The determination unit 340 specifies information indicating "X". In addition, when the signal received by the user apparatus is a retransmission packet, the determination unit 340 also specifies how many times retransmission has been performed.

The code information and resource information unit 342 specifies code information which includes information of a CAZAC code sequence (sequence number), a cyclic shift amount of CAZAC code sequence, a transmission band and the like, used by the user apparatus. The code information may be derived based on broadcast information of the broadcast channel, or may be reported from the base station individually. The individual reporting may be performed using signaling of the upper layer such as a L3 control signal. The code information further specifies an orthogonal code sequence represented by a set of factors (block spread code sequence) by which each set of a plurality blocks is multiplied.

The code information and resource information unit 342 refers to a list indicating correspondence relationship between "X" which is the downlink L1/L2 control information number (number of times of retransmission, as necessary) and resources of the uplink control signal in order to specify resources by which the uplink control signal including acknowledgement information should be transmitted.

Figure 7:
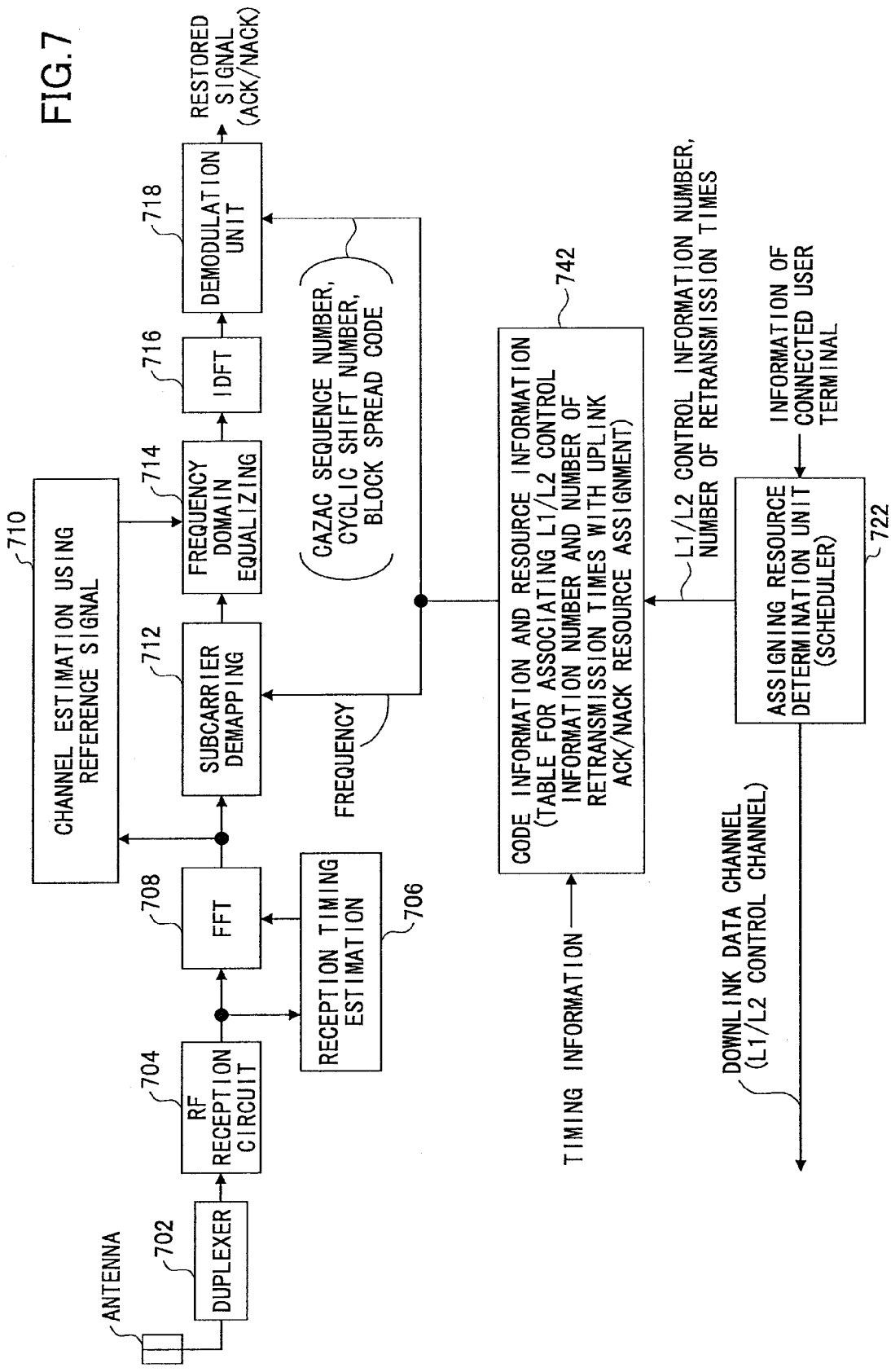
FIG. 7 shows a block diagram of a base station apparatus according to a first embodiment of the present invention.

FIG. 7 shows a base station apparatus according to an embodiment of the present invention. FIG. 7 shows a duplexer 702, an RF reception circuit 704, a reception timing estimation unit 706, a fast Fourier transform unit (FFT) 708, a channel estimation unit 710, a subcarrier demapping unit 712, a frequency domain equalizing unit 714, an inverse discrete Fourier transform unit (IDFT) 716, a demodulation unit 718, a scheduler 722, and a code information and resource information unit 742.

The duplexer 702 properly separates between a transmission signal and a received signal such that simultaneous communication is realized.

The RF reception circuit 704 performs processing such as digital analog conversion, frequency conversion, band limitation and the like for processing the received symbol in baseband.

The reception timing estimation unit 706 specifies reception timing based on a synchronization channel or a reference signal in a received signal.

The fast Fourier transform unit (FFT) 708 performs Fourier transform to convert time series information to information in the frequency domain.

The channel estimation unit 710 estimates a channel state in the uplink based on reception state of the uplink reference signal, and outputs information for performing channel compensation.

The subcarrier demapping unit 712 performs demapping in the frequency domain. This processing is performed in response to mapping in the frequency domain performed in the individual user apparatuses.

The frequency domain equalizing unit 714 performs equalization of the received signal based on the channel estimation value.

The inverse discrete Fourier transform unit (IDFT) 716 restores a frequency domain signal into a time domain signal by performing inverse discrete Fourier transform.

The demodulation unit 718 demodulates the received signal. As to the present invention, an uplink control signal is demodulated, so that the demodulation unit 718 outputs channel state information (CQI) of downlink channel and/or acknowledgement information (ACK/NACK) for downlink data signal.

The scheduler 722 determines assignment in the downlink based on quality of the channel state information (CQI) of the downlink channel and other criteria. In addition, the scheduler 722 determines uplink resource assignment based on reception result of the reference signal transmitted from each user apparatus and other criteria. The determined information is output as scheduling information. The scheduling information specifies frequency, time, transmission format (data modulation scheme and channel coding rate) and the like used for transmitting signals.

In addition, the scheduler 722 reports, to the code information and resource information unit 742, information indicating where the control information for each user apparatus is mapped in the downlink L1/L2 control signal. The information indicates a position number to which control information of each user is mapped from among multiple pieces of control information of one or more users multiplexed in the downlink L1/L2 control signal. In the above-mentioned example, control information addressed to a user apparatus is mapped to an X-th position, and information of "X" is reported to the code information and resource information unit 742 for the user apparatus.

Based on the assignment result by the scheduler, the code information and resource information unit 742 specifies code information which includes a sequence number indicating a CAZAC code used by a user apparatus in the uplink, cyclic shift amount, usable frequency band, block spread code and the like. The code information may be commonly reported to each user using the broadcast channel, or may be reported individually to individual users. In the former case, it is necessary that each user apparatus uniquely derives specific code information for the user apparatus from broadcast information.

Like the code information and resource information unit 342 (FIG. 2), the code information and resource information unit 742 refers to a list indicating correspondence relationship between X which is a downlink L1/L2 control information number (number of times of retransmission as necessary) and resources of the uplink control signal, and specifies resources to be used for transmitting the uplink control signal including the acknowledgement information in the future.

Figure 8:
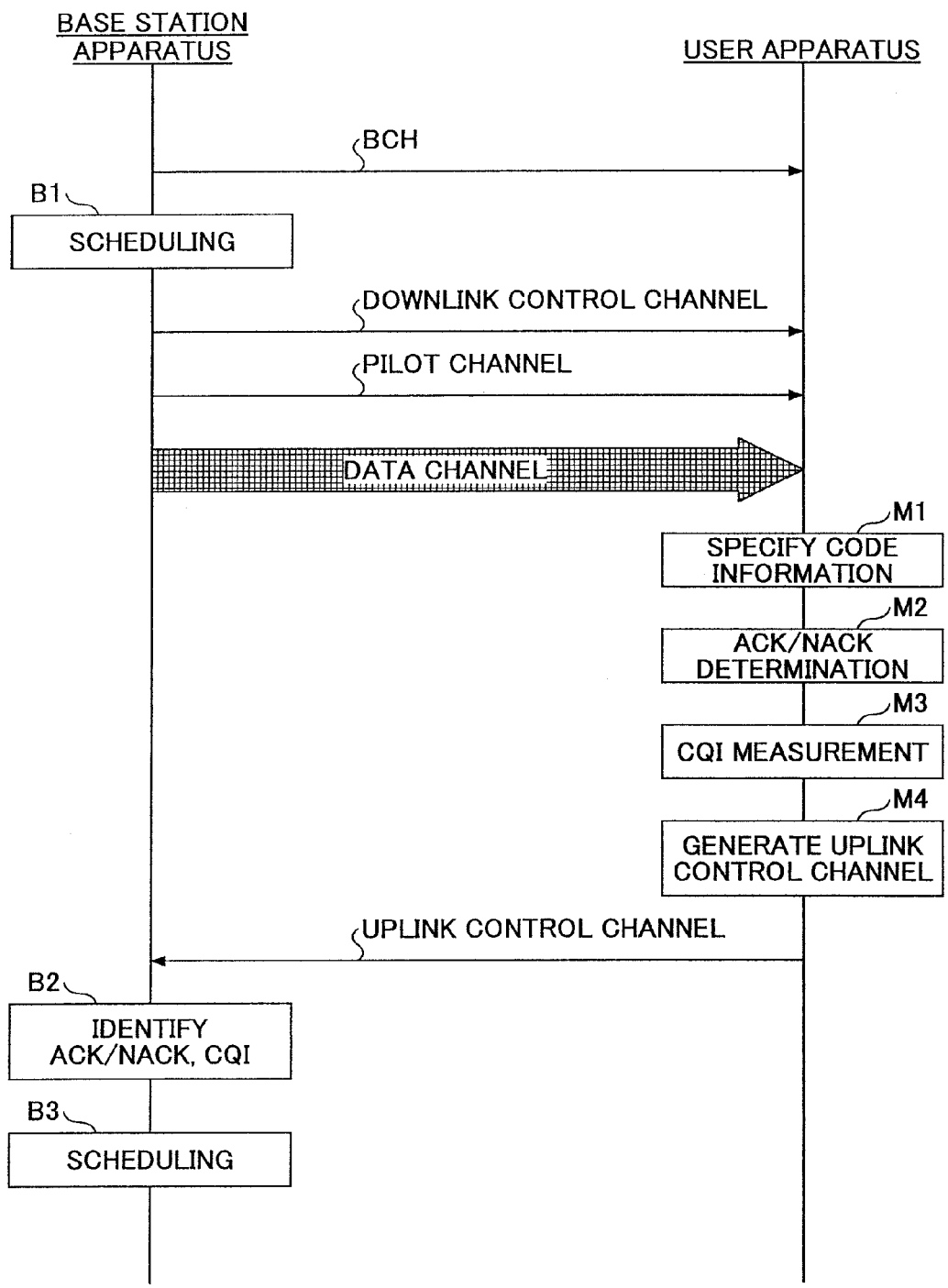
FIG. 8 is a flowchart showing an operation example of the present invention.

FIG. 8 shows an operation procedure according to an embodiment of the present invention. In this operation example, general code information related to all user apparatuses are transmitted by the broadcast channel (BCH). Each user apparatus uniquely derives code information specific to the own apparatus from the broadcast information. The general code information may include information indicating that there are N CAZAC code sequences (C#1, C#2, C#N) used in the cell, there are M cyclic shift amounts (0, $L_A$, ..., $(M-1) \times L_A$) for each sequence, and that frequency division multiplexing (FDM) scheme is used and there are F available bandwidths (Bw1, Bw2, ..., BwF), and the like. As necessary, the code information may include information on block spread code.

In step B1, the base station apparatus performs downlink scheduling, and the base station apparatus sends a downlink control signal (L1/L2 control signal), a downlink data signal and a reference signal to the user apparatus.

In step M1, the user apparatus specifies information (code information for the user apparatus) related to the code used for an uplink control signal based on information included in the downlink control signal.

Figure 9:
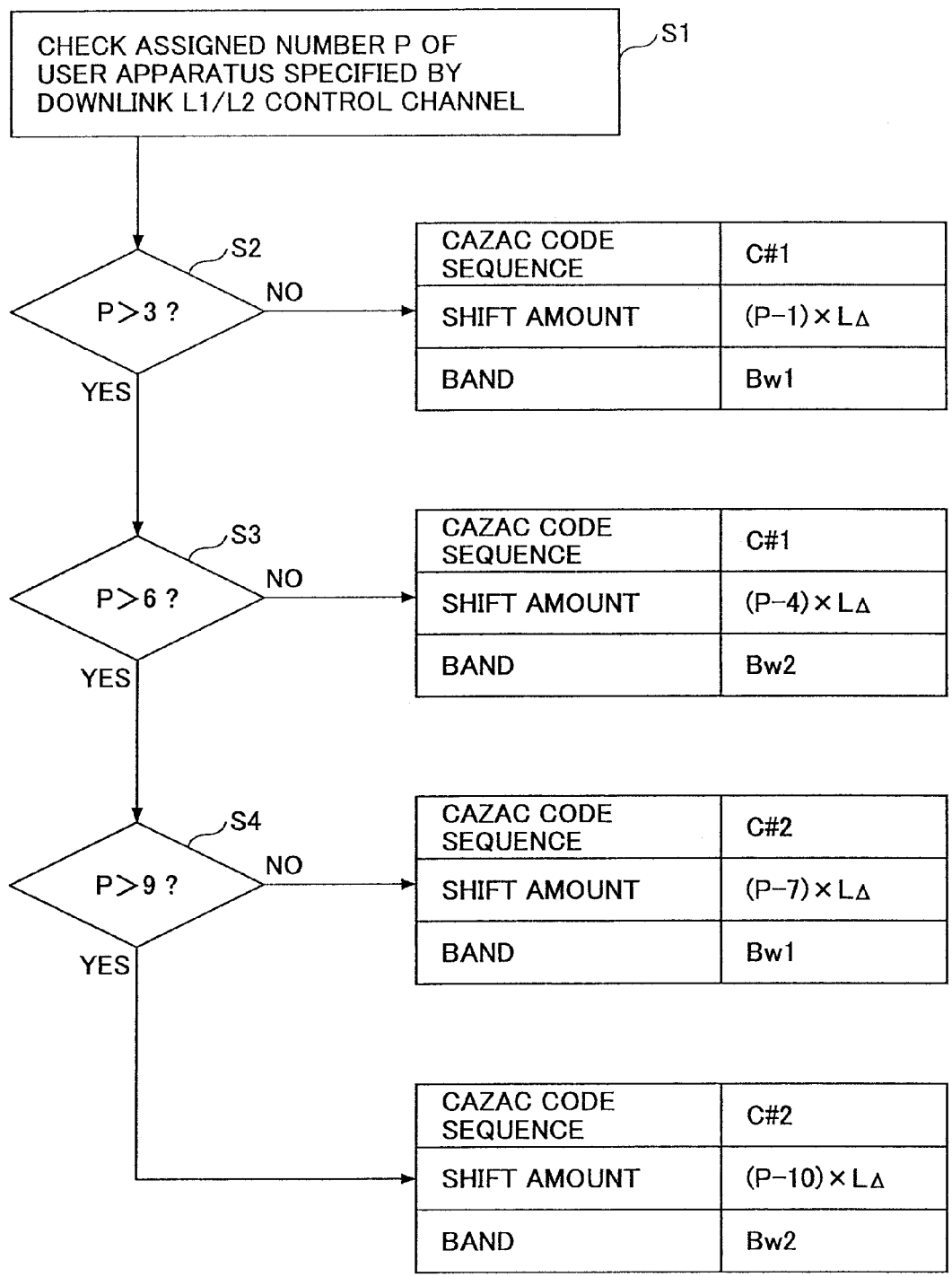
FIG. 9 is a flowchart for specifying code information from broadcast information and assigned number.

FIG. 9 shows an example of a method for specifying code information that may be used in step M1. For the sake of simplicity, it is assumed that two CAZAC code sequences (C#1, C#2) are prepared, three cyclic shift amounts (0, $L_A$, $2L_A$) are prepared for each sequence, and that two available bands (Bw1, Bw2) are prepared. Therefore, 2×3×2=12 user apparatuses can be identified. The numbers are merely examples, and other proper numbers may be used.

In step S1, the user apparatus recognizes an assigned number P(=1, 2, ..., 12) of the user apparatus specified in the downlink L1/L2 control signal.

In step S2, the user apparatus determines whether the assigned number p is greater than 3 or not. When the determination result is No (when p=1, 2 or 3), the sequence number is specified as C#1, the shift amount is specified as $(P-1) \times L_A$, and the band is specified as Bw1. When the assigned number is greater than 3, the process flow goes to step S3.

In step S3, the user apparatus determines whether the assigned number p is greater than 6 or not. When the determination result is No (when p=4, 5 or 6), the sequence number is specified as C#1, the shift amount is specified as $(P-1) \times L_A$, and the band is specified as Bw2. When the assigned number is greater than 6, the process flow goes to step S4.

In step S4, the user apparatus determines whether the assigned number p is greater than 9 or not. When the determination result is No (when p=7, 8 or 9), the sequence number is specified as C#2, the shift amount is specified as $(P-7) \times L_A$, and the band is specified as Bw1. When the assigned number is greater than 9 (when p=10, 11 or 12), the sequence number is specified as C#2, the shift amount is specified as $(P-10) \times L_A$, and the band is specified as Bw2.

Figure 10:
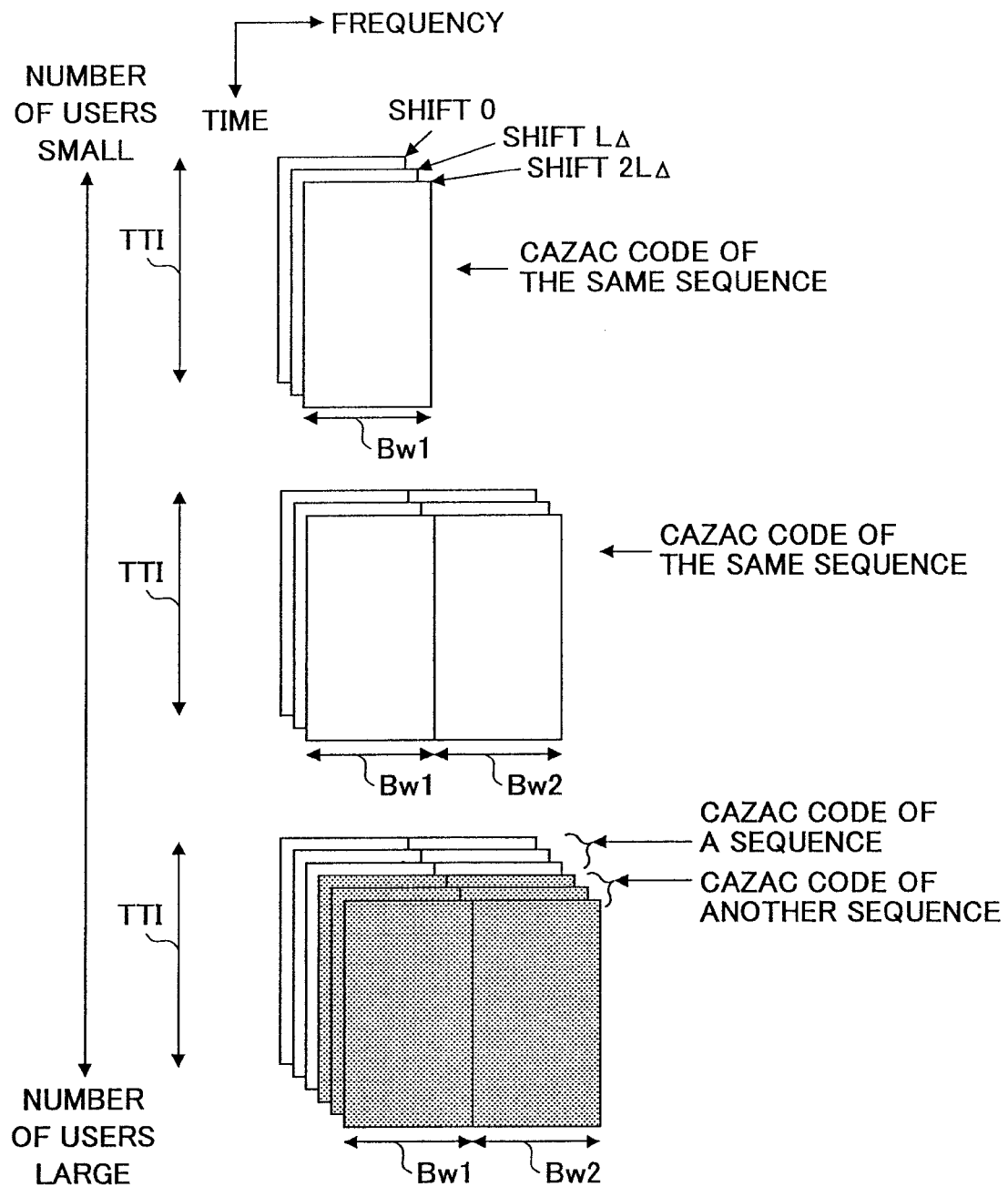
FIG. 10 is a diagram showing setting examples of CAZAC codes, cyclic shift amounts and bands realized by executing the flow shown in FIG. 9.

FIG. 10 shows examples of CAZAC codes, cyclic shift amounts and bands realized by executing the flow shown in FIG. 9. As shown in the figure, users are multiplexed using a code division multiplexing (CDM) scheme using a CAZAC code of a same sequence, first. As the number of users increases, users are code-multiplexed using the same CAZAC code sequence in another band. After that, CDM is performed in each available band. In other words, although CDM and FDM are performed, CDM is given preference. In the case when multiplexing users the number of which is greater than the number of users that can be identified by code division multiplexing using a CAZAC code sequence and using frequency division multiplexing, another CAZAC code sequence is prepared, and users are multiplexed by CDM, and CDM and FDM.

Assuming that N CAZAC code sequences (C#1, C#2, C#N) are prepared, M cyclic shift amounts (0, $L_A$, ..., $(M-1) \times L_A$) are prepared, frequency division multiplexing scheme (FDM) is used, and that F available bands (Bw1, Bw2, BwF) are prepared, the sequence number of CAZAC code is represented as a value of $(P/(M \times F))$ in which a fractional portion is round up, a $((P-(n-1) \times (M \times F))/M)$-th band is used, and the cyclic shift amount is represented as $(P-((n-1) \times (M \times F))-(f-1) \times M = P \mod M)$ times $L_A$.

In the example described with reference to FIGS. 9 and 10, the user apparatus starts to use another band Bw2 at the time when the assigned number or the number of multiplexed users exceeds three. However, even when the number of multiplexed users is greater than 3 and equal to or less than 6, it can be considered to use the same band Bw1, and instead, use another CAZAC code sequence C#2. The CAZAC codes C#1 and C#2 are not orthogonal to each other in which one cannot be derived from another by cyclically shifting. However, the reason to use C#1 and C#2 is that the cross-correlation value is relatively small.

As mentioned above, code information of each user apparatus can be specified from the broadcast information and the assignment information p. The specified code information is provided to the CAZAC sequence number setting unit 331, the cyclic shift number setting unit 333, the block spread code setting unit 335, the frequency setting unit 337 and the reference signal setting unit 38 shown in FIG. 2, so that various parameters are set.

In step M2 in FIG. 8, the user apparatus determines presence or absence of an error for each packet of the downlink data signal. For example, the error detection may be performed using the cyclic redundancy check (CRC) method, or any other proper error detection method known in this technical field may be used. The user apparatus determines positive acknowledgement ACK which indicates there is no error (or within a permissible range even if there is an error) or negative acknowledgement NACK which indicates there is an error, for each packet. The ACK and the NACK form the acknowledgment information.

In step M3, the user apparatus measures reception quality of the downlink reference signal, and converts the measurement value to a numerical value within a range to derive the channel state information (CQI). For example, in the case when the reception quality (SIR and the like) is represented as 32 levels, the user apparatus converts the measurement result to a numerical value indicating what level the current reception quality is, so that CQI that can be represented by 5 bits is derived.

It is not essential that the steps M2 and M3 are performed in this order. The determination of the acknowledgement information and the measurement of the channel state information may be performed at any proper time.

In step M4, the user apparatus generates an uplink control signal for reporting, to the base station, both or one of the acknowledgement information (ACK/NACK) or the channel state information (CQI). As mentioned above, the block-by-block modulation pattern generation unit shown in FIG. 2 prepares one factor for each of 12 blocks, so that 12 factors (first factor-twelfth factor) are prepared for one TTI. One or more of the 12 factors may represent the acknowledgement information, the channel state information or other information. The uplink control signal has a frame structure shown in FIGS. 3 and 6.

For example, the first long block (LB1) is generated by multiplying the whole CAZAC code sequence (cyclically shifted) by the first factor. The second long block (LB2) is generated by multiplying the same CAZAC code sequence by the second factor. After that, in the same way, a K-th long block (LBK) is generated by multiplying the same CAZAC code by the K-th factor. Accordingly, a frame for the uplink control signal including 12 long blocks is generated. More properly, the frame includes a reference signal formed by a CAZAC code.

The uplink control signal generated in this way is transmitted from the user apparatus to the base station using a dedicated band. The user apparatus can uniquely determine which part in the dedicated band is used based on resource information. The resource information indicates predetermined correspondence relationship between a mapping position in the downlink L1/L2 control signal and resources of the uplink control signal, and is specified by the code information and resource information units 342 and 742 shown in FIGS. 2 and 7.

For example, assuming that control information for a user apparatus is mapped to a X-th position in the downlink L1/L2 control signal which includes information of N users, the corresponding relationship uniquely associates X with slot (FIG. 1), CAZAC code (sequence number, cyclic shift amount), block spread code, frequency band and the like used for the uplink control signal. This correspondence relationship is known to the user apparatus and the base station apparatus. Accordingly, resources to be used for the uplink control signal including acknowledgement information are uniquely derived based on information indicating that "control information (control information accompanying the downlink data signal) addressed to the user apparatus is mapped to the X-th position", and the uplink control signal is transmitted using the resources.

Figure 11:
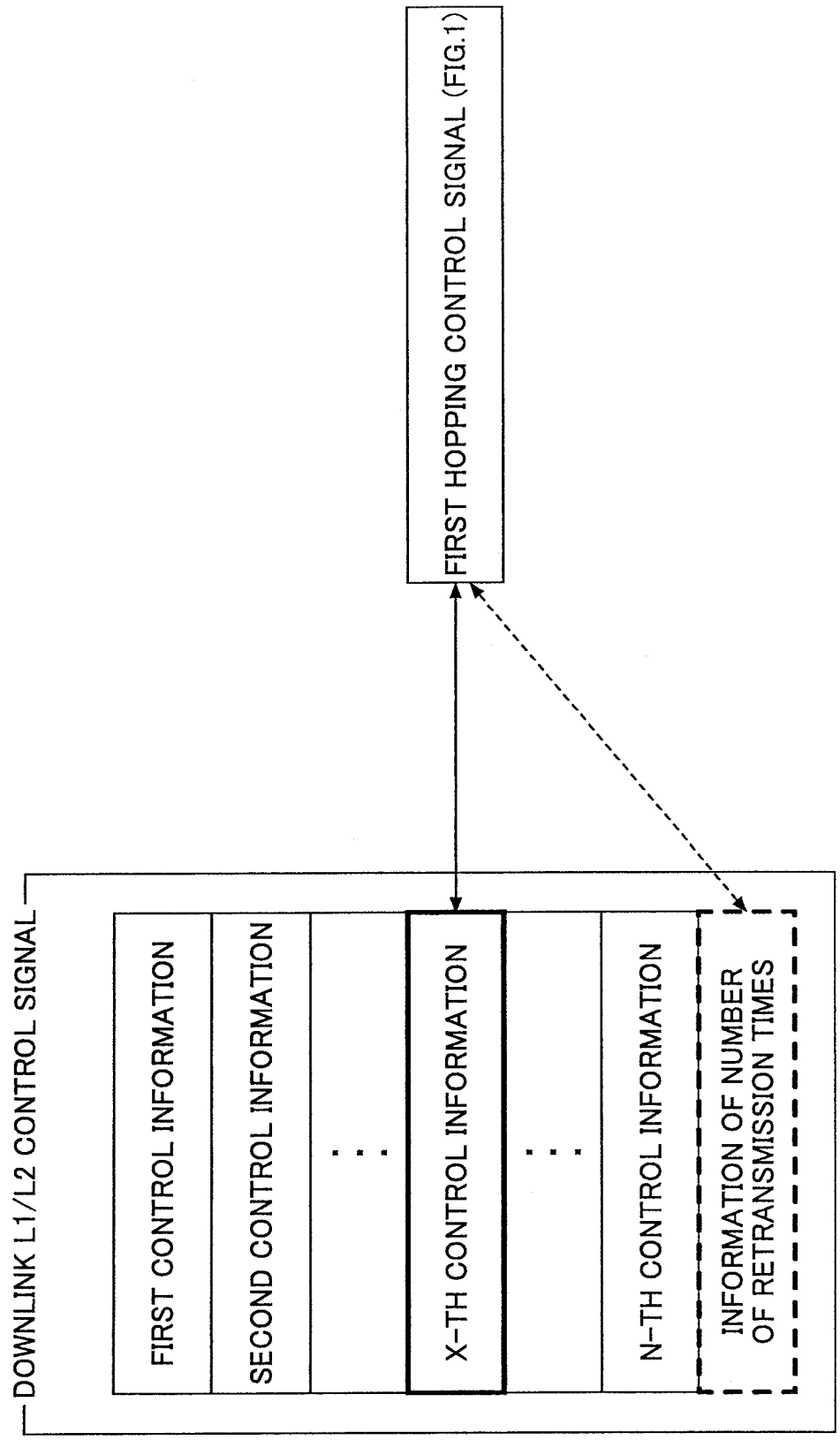
FIG. 11 is a diagram showing an example of correspondence relationship between resources of downlink control signal addressed to the user apparatus and resources of the uplink control signal.

FIG. 11 schematically shows such a predetermined correspondence relationship. In the example shown in the figure, when control information accompanying the downlink data signal addressed to a user apparatus (that is, control information including scheduling information) is mapped to an X-th position, ACK/NACK for the downlink data signal is transmitted by the first hopping control signal (FIG. 1). The downlink data signal may be a retransmission packet instead of a new packet. In the case when a resource block used for the retransmission packet is specifically determined, the correspondence relationship is determined considering such information.

FIG. 12 shows a situation in which resources for the uplink control signal are reserved for a user performing persistent scheduling. When downlink communication based on persistent scheduling is performed, the downlink L1/L2 control signal is not transmitted. In this case, an uplink control signal including ACK/NACK is transmitted by resources specifically prepared as shown in FIG. 12.

In step B2 in FIG. 8, the base station apparatus receives uplink control signals from a plurality of user apparatuses, and demodulates the signals. Each user apparatus transmits a similar uplink control signal. But, the uplink control signals use the same CAZAC code sequence having different cyclic shift amounts, different bands, CAZAC code of different sequences and/or different block spread codes. These are specified by the code information and resource information unit 742.

As mentioned above, since the whole CAZAC code is merely multiplied by one factor in each long block, the base station apparatus can add uplink control signals received from each user apparatus in phase. Therefore, when the block spread code is used, orthogonality of the code is exerted. In addition to that, orthogonality among CAZAC codes of the same sequence having different cyclic shift amounts is not collapsed. Thus, the base station apparatus can orthogonally separates signals sent from each user apparatus. Even when non-orthogonal CAZAC code is used, the user apparatus can be identified with lower interference as compared with the case in which a random sequence is used. Further, by determining the contents of the first to twelfth factors used for the uplink control signal for each user apparatus, contents of acknowledgement information and/or channel state information can be identified.

In step B3, the base station apparatus performs processing such as retransmission control and resource assignment based on acknowledgement information (ACK/NACK) and/or channel state information (CQI) reported from the user apparatus by the uplink control signal.

According to the present embodiment, the mapping position of the information addressed to the user apparatus in the downlink L1/L2 control signal and resources for the uplink control signal including ACK/NACK are uniquely determined by using the predetermined correspondence relationship. Thus, it becomes unnecessary to report resources to be used for the uplink control signal one by one. Since it is only necessary to prepare resources for (the number of multiplexed users and the number of times of retransmission) at most, resources can be saved as compared with the after-mentioned second embodiment.

[Embodiment 2]

FIG. 13 shows a block diagram of the user apparatus according to a second embodiment of the present invention. In general, the user apparatus is similar to one described with reference to FIG. 2. But, the user apparatus shown in FIG. 13 is different from one shown in FIG. 2 in processing of the unit 340' for determining resource block number of the downlink data signal, and the code information and resource information unit 342'.

The unit 340' for determining the resource block number of the downlink data signal extracts control information addressed to the user apparatus from the downlink L1/L2 control signal, and determines a resource block to which the downlink data signal addressed to the user apparatus is mapped. For the sake of explanation, it is assumed that the downlink data signal is transmitted to the user apparatus using a Y-th resource block (RB-Y).

In addition to specifying code information like the unit 342 shown in FIG. 2, the code information and resource information unit 342' refers to a list indicating correspondence relationship between the location (RB-Y) of the resource block used for the downlink data signal and resources of the uplink control signal, and specifies which resource should be used for transmitting the uplink control signal including the acknowledgement information. The specified code information and resources are reported to each component like the case of the first embodiment.

FIG. 14 shows a block diagram of the base station apparatus according to the second embodiment of the present invention. In general, the base station apparatus shown in FIG. 14 is similar to one shown in FIG. 7. But, the base station apparatus shown in FIG. 14 is different from that shown in FIG. 7 in processing on the code information and resource information unit 742'. First, the scheduler 722 reports information indicating a resource block to which the downlink data signal addressed to each user apparatus is mapped, to the code information and resource information unit 742'. Assuming that a data signal addressed to a user apparatus is mapped to a Y-th resource block (RB-Y), information indicating that "the resource block is RB-Y" is reported to the code information and resource information unit 742' as to the user apparatus.

In addition to specifying code information like 742 shown in FIG. 7, the code information and resource information unit 742' refers to predetermined correspondence relationship between the resource block number (RB-Y) and resources of the uplink control signal including ACK/NACK for the data signal transmitted using the resource block, so that the code information and resource information unit 742' specifies which resource should be used for transmitting the uplink control signal in the future.

FIG. 15 shows an example of the correspondence relationship. In the example shown in the figure, as to 16 resource block numbers, ACK/NACK for the first to eighth resource blocks are transmitted by the first hopping control signal (FIG. 1), and ACK/NACK for the ninth to sixteenth resource blocks are transmitted by the second hopping control signal (FIG. 1).

In the present embodiment, since the resource block number used for the user apparatus and the resources for the uplink control signal including ACK/NACK are uniquely determined by the predetermined correspondence relationship, it is not necessary to report, to the user apparatus, information indicating which resource should be used for uplink control signal one by one. Since resources for the uplink control signal are uniquely derived from the resource block number used for the user apparatus, it is not necessary to identify whether the data signal transmitted by the resource block is based on persistent scheduling or not. In addition, since the resource block number is used as a basis, instead of using the mapping position of the control signal like the first embodiment, resources for uplink control signal can be easily specified.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment is not essential in the present invention, and equal to or more than two embodiments may be used as necessary. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-073724, filed in the JPO on Mar. 20, 2007 and the entire contents of the Japanese patent application No. 2007-073724 is incorporated herein by reference.

The invention claimed is:

1. A base station apparatus for receiving an uplink control signal from a user apparatus using a single carrier scheme, comprising:
a transmission unit configured to transmit a downlink control signal and a downlink data signal; and
a receiving unit configured to receive an uplink control signal including acknowledgement information indicating positive acknowledgement or negative acknowledgement for the downlink data signal,
wherein, the receiving unit, in which a correspondence relationship that uniquely associates a resource of the downlink control signal with a resource to be used for the uplink control signal is defined, receives the uplink control signal in the resource that is specified according to the correspondence relationship based on a resource of the downlink control signal transmitted by the transmission unit, and
wherein the receiving unit specifies a cyclic shift amount and a frequency band as the resource to be used for the uplink control signal, and receives the uplink control signal using the specified frequency band, the uplink control signal being generated by multiplying an orthogonal code sequence by the acknowledgment information, the orthogonal code sequence being cyclically rearranged with the specified cyclic shift amount.

2. The base station apparatus as claimed in claim 1, wherein the receiving unit specifies a block spread code, and receives the uplink control signal to which the block spread code is used.

3. The base station apparatus as claimed in claim 1, wherein the correspondence relationship uniquely associates an OFDM symbol to which the downlink control signal for the user apparatus is mapped with a time slot to which the uplink control signal is mapped.

4. The base station apparatus as claimed in claim 1, wherein, when communication is performed by persistent scheduling in downlink, the uplink control signal including the acknowledgement information is received using a resource different from a resource for a user apparatus that is not performing persistent scheduling.

5. The base station apparatus as claimed in claim 1, wherein the uplink control signal includes a plurality of unit block sequences each of which is obtained by multiplying all chips of an orthogonal code sequence for the user apparatus by a same factor.

6. The base station apparatus as claimed in claim 5, wherein factors by which each of a plurality of unit blocks having the same contents is multiplied represent an orthogonal code sequence.

7. A communication method for use in a base station apparatus for receiving an uplink control signal from a user apparatus using a single carrier scheme, comprising the steps of:
transmitting a downlink control signal and a downlink data signal; and
receiving an uplink control signal including acknowledgement information indicating positive acknowledgement or negative acknowledgement for the downlink data signal,
wherein, the receiving step, in which a correspondence relationship that uniquely associates a resource of the downlink control signal with a resource to be used for the uplink control signal is defined, includes receiving the uplink control signal in the resource that is specified according to the correspondence relationship based on a resource of the downlink control signal transmitted in the transmitting step, and
wherein the receiving unit specifies a cyclic shift amount and a frequency band as the resource to be used for the uplink control signal, and receives the uplink control signal using the specified frequency band, the uplink control signal being generated by multiplying an orthogonal code sequence by the acknowledgment information, the orthogonal code sequence being cyclically rearranged with the specified cyclic shift amount.

* * * * *